United States Patent
Grössl

(10) Patent No.: US 12,462,214 B2
(45) Date of Patent: Nov. 4, 2025

(54) INTRALOGISTICS SYSTEM FOR MONITORING LOCATION-SPECIFIC INTRALOGISTICAL ACTIONS

(71) Applicant: SSI Schäfer Automation GmbH (AT), Graz (AT)

(72) Inventor: Christoph Grössl, Graz (AT)

(73) Assignee: SSI Schäfer Automation GmbH (AT), Graz (AT)

( * ) Notice: Subject to any disclaimer, the term of this patent is extended or adjusted under 35 U.S.C. 154(b) by 0 days.

(21) Appl. No.: 19/101,518

(22) PCT Filed: Aug. 11, 2023

(86) PCT No.: PCT/EP2023/072304
§ 371 (c)(1),
(2) Date: Feb. 5, 2025

(87) PCT Pub. No.: WO2024/033528
PCT Pub. Date: Feb. 15, 2024

(65) Prior Publication Data
US 2025/0259135 A1    Aug. 14, 2025

(30) Foreign Application Priority Data
Aug. 12, 2022  (DE) .................. 10 2022 120 389.1

(51) Int. Cl.
*G06Q 10/0833*    (2023.01)
*G06Q 10/0633*    (2023.01)
(52) U.S. Cl.
CPC ..... *G06Q 10/0833* (2013.01); *G06Q 10/0633* (2013.01)
(58) Field of Classification Search
CPC ............... G06Q 10/0833; G06Q 10/0633
See application file for complete search history.

(56) References Cited

U.S. PATENT DOCUMENTS 8,423,431 B1 * 4/2013 Rouaix ............... G06Q 10/087
  705/28
8,781,621 B2 * 7/2014 Hirata ................ G11B 15/689
  700/218

(Continued)

FOREIGN PATENT DOCUMENTS

DE    102016005691 A1    11/2017
DE    102018207175 A1    11/2019

(Continued)

OTHER PUBLICATIONS

International Preliminary Report on Patentability for International Application No. PCT/EP2023/072304, mailed Feb. 27, 2025.

(Continued)

*Primary Examiner* — Kyle O Logan
(74) *Attorney, Agent, or Firm* — Jason H. Vick; Amped IP LLC

(57) ABSTRACT

The disclosure refers to an intralogistics system (10) for monitoring predetermined location-specific action being uniquely associated with one location (68) of a plurality of different locations (68) in the intralogistics system (10) and being uniquely associated with a movable system entity (16), which is to perform the action, wherein the intralogistics system (10) comprises: a control (12) communicating an order (64) being uniquely associated with the action to the movable system entity (16) and being configured for: maintenance (26) of a system component (70) of a plurality of system components (70); material-flow control (30); and/or picking guidance (32); a reading device (24), which the movable system entity (16) carries along and which is connected, for data exchange, to the control (12); and a projector (14) configured to project location-specific codes (34), on command from the control (12), onto several ones of the locations (68) within the intralogistics systems (10); wherein the control (12) is further configured to verify (Continued)

performance of the action based on the order (64) and a received confirmation signal, which is generated by the reading device (24) and transmitted to the control (12) as soon as the reading device (24) has read one of the location-specifically projected codes (34).

16 Claims, 5 Drawing Sheets

(56) References Cited

U.S. PATENT DOCUMENTS

| | | | | |
|---|---|---|---|---|
| 8,958,904 | B2* | 2/2015 | Sakamoto | G07D 11/24 |
| | | | | 700/226 |
| 10,040,628 | B1* | 8/2018 | Misra | G06Q 10/08 |
| 2010/0121480 | A1* | 5/2010 | Stelzer | G06Q 10/087 |
| | | | | 700/229 |
| 2014/0139654 | A1* | 5/2014 | Takahashi | G06V 10/245 |
| | | | | 348/61 |
| 2015/0192774 | A1* | 7/2015 | Watanabe | G06Q 10/08 |
| | | | | 345/8 |
| 2017/0200115 | A1* | 7/2017 | High | G02B 27/017 |
| 2019/0347130 | A1* | 11/2019 | Baumgaertner | G06F 9/4881 |
| 2020/0265381 | A1* | 8/2020 | Willard, III | B65G 1/1378 |
| 2020/0272970 | A1* | 8/2020 | Willard, III | G06Q 30/0635 |
| 2020/0311644 | A1* | 10/2020 | Willard, III | G06Q 30/0601 |
| 2024/0303594 | A1* | 9/2024 | Francis | G06Q 10/08 |
| 2025/0076894 | A1* | 3/2025 | Fan | G05D 1/69 |

FOREIGN PATENT DOCUMENTS

| | | |
|---|---|---|
| DE | 102018112012 B4 | 3/2021 |
| DE | 102020114870 A1 | 12/2021 |
| EP | 2161219 A1 | 3/2010 |
| EP | 2554496 A1 | 2/2013 |

OTHER PUBLICATIONS

International Search Report for International Application No. PCT/EP2023/072304, mailed Nov. 3, 2023.

Written Opinion for International Application No. PCT/EP2023/072304, mailed Nov. 3, 2023.

* cited by examiner

| ORDER # 64 | CODE # 34 | ORDER TYPE 66 | ENTITY 16 | LOCATION 68 | COMPONENT 70 | TIME 72 |
|---|---|---|---|---|---|---|
| 1 | 1 | MAINTENANCE | TECHNICIAN #1 | A FRAME #4 | DISPENSER #4 | 10 min |
| 2 | 2 | MF TRACKING | AGV #3 | CROSSING #2 | — | 14:35 |
| 3 | 3 | PICKING ORDER #8 | PICKING PERSON #2 | RACK COMPARTMENT #5 | — | — |
| .... | .... | .... | .... | .... | .... | .... |
| i | i | | | | | |

Fig. 4

INTRALOGISTICS SYSTEM FOR MONITORING LOCATION-SPECIFIC INTRALOGISTICAL ACTIONS

CROSS-REFERENCE TO RELATED APPLICATIONS

This application is a national stage application under 35 U.S.C. 371 of PCT Application No. PCT/EP2023/072304 having an international filing date of 11 Aug. 2023, which designated the United States, which PCT application claimed the benefit of German Application No10 2022 120 389.1, filed 12 Aug. 2022, each of which are incorporated herein by reference in their entirety.

BACKGROUND

The present disclosure generally relates to the field of intralogistics, and in particular to an intralogistics system which is capable of monitoring maintenance processes and material-flow control. In doing so, a person is guided by light to a predetermined location at which an (only) machine-readable location-specific code is displayed for verification (by a higher-level control) of an action to be carried out there.

Light-based picking guidance for navigation through a warehouse and finding a removal location, or delivery location, is known.

The document U.S. Pat. No. 8,423,431 discloses a picking facility including a plurality of stationarily installed projectors for visual wayfinding (navigation). The projectors project 2D symbols (e.g., an arrow including a picking person's name, text description of the route, etc.) along a route onto the floor or onto the walls of the facility in order to guide a picking person (spatially) through the facility to a removal or delivery location. When the picking person arrives at the removal or delivery location, this location itself is illuminated and, if necessary, information (e.g., an image of the article, a contour of the article, a name of the article, etc.) on the to-be-handled object is displayed. The picking person carries along a communication unit being wirelessly connected to a higher-level control for determining (e.g., by means of triangulation) the current location of the picking person. Based on this so-determined location information the control may select one of the projectors for facilitating display of suitable information to the picking person in order to find the location and/or identify the object to be handled. In addition, one of the (location) projectors, such as a laser pointer, may also be mounted on a picking trolley which the picking person carries along while walking through the facility.

For effectively guiding the person (i.e. navigating him/her through the system), it is also necessary to know the current position of the person as exactly as possible. Therefore, the person carries along the communication unit which permanently transmits position data to the control, from which the position of the person is calculated periodically at high rate. This is labor and resource intensive. The constantly recurring position determination cannot be omitted.

The document DE 10 2018 203 175 A1 (cf. FIGS. 5 and 6 there) discloses a movable picking trolley, which includes a frame-fixedly mounted autostereoscopic projector for picking guidance (removal and/or delivery). The projector generates a (three-dimensionally appearing) image, such as an arrow indicating to a picking person a removal or delivery location. Thus, picking guidance based on pick-by-light or put-by-light is disclosed. One of several storage containers, which are arranged in levels of a rack frame beneath the projector, is arranged at the indicated location. The picking person gets a depth impression by viewing a stereoscopically represented symbol (e.g., a number of a removal quantity, the arrow for this location, a photo of the article, a name of the article, or a contour of the article) at the location where the corresponding container is arranged. Upon stereoscopic illustration two images (respectively one for the left and right eye) are generated which are combined in the observer's brain for creating depth perception.

The document EP 2 554 496 A1 in turn discloses visual navigation guidance in a picking facility (rack warehouse). The picking person is guided by a laser projector through the warehouse up to a rack compartment by projecting corresponding navigation information (e.g., arrows or text) onto the floor. The laser projector is mounted movably on the ceiling of the warehouse.

The document DE 10 2016 005 691 A1 also discloses a picking guidance by means of a stationary projection unit which illuminates rack compartments of a storage rack for finding a removal location. The projection unit is capable of visually marking several ones of the rack compartments at the same time. The image information displayed by the projection unit includes: graphical contents, different colors, numbers, letters, tickers, patterns, and/or images. The information may be displayed flashing. The rack compartments may be highlighted with an index projection (frame around the compartment, or flashing effect). Removal confirmation is performed via a mobile wireless confirmation device, or via gesture recognition. The confirmation device comprises a button which is operated after removal for signaling the removal to the control. This signal may also contain position data of the mobile device so that the control knows which of the rack-compartment projections can be turned off since the removal has happened at the corresponding rack compartment.

Another problem area concerns the maintenance of components of an intralogistics system.

Maintenance orders are conducted by maintenance technicians who are to walk to the components to be maintained in order to inspect the components and, if necessary, replace them. The technician gets a list containing all the components to be maintained, either in printed form or as a file. It is expected that the technician walks to the components, scans an identifier thereof, and carries out the inspection. In practice, it has been found that technicians obtain the component identifiers as copies in advance, and, at the time of the actual maintenance, scan the identifier copy only without actually inspecting the component. This saves the technicians the trip to the components, and they are also finished much faster because the maintenance actually is not carried out. Nevertheless, system operator must pay for the alleged maintenance. Furthermore, the reliability of the system suffers because the maintenance has not been carried out at all. It would be desirable to create a system that prevents such work bypass, or work avoidance, and that ensures that the technician can perform the maintenance only at the location of the component to be maintained.

Yet another problem area concerns the tracking of the material flow, as will be described in more detail below.

Therefore, it is an object of the present disclosure to create an improved intralogistics system.

This object is solved by an intralogistics system for monitoring a predetermined location-specific action (maintenance, tracking, picking, etc.) being uniquely associated with a (single) location of a plurality of different locations in the system and being uniquely associated with a movable system entity which is to perform the action, wherein the intralogistics system comprises: a control communicating an order, which is uniquely associated with the action and corresponds to the order, to the movable system entity (human, robot, AGV, etc.), and being configured for: maintenance of one system component of a plurality of system components; material-flow control; and/or picking guidance; a reading device, which the movable system entity carries along and is connected to the control for data exchange; and a projector configured to project location-specific codes, on command from the control, onto several ones of the locations within the intralogistics system, wherein (exactly) one of the codes is assigned to the order; wherein the control is configured further to verify performance of the action based on the order and a received confirmation signal, which is generated by the reading device and transmitted to the control as soon as the reading device has read one of the location-specifically projected codes.

The location-specific code is projected onto a specific location, which is uniquely associated with the action to be performed. Thus, this code can only be read at the relevant location. This requires that the reading device is located at this location. The code cannot be printed in advance and read at a different location.

The control receives, by the reading of the location-specific code, a direct feedback including the information that the reading device is located at the desired location. The code read by the reading device is part of the confirmation signal, or even corresponds to the confirmation signal. Based on this signal, the control may verify whether the proper code (e.g., from the proper entity) has been read. It can also be verified whether the proper reading device has read the proper code. In addition, it may be verified whether the code has been read at the proper time.

Preferably, the control is configured to project one of the codes at a time only.

In this manner it can be ensured that, in case if several actions are to be performed, a desired sequence is followed when the actions are performed.

Alternatively, the control may be configured to project several ones of the codes at the same time onto the corresponding locations.

In this case, a person or machine can decide for themselves, and thus determine a sequence of performance, which of the actions is to be performed first and which of the actions is to be performed last.

In this case, it is advantageous if the confirmation signal further comprises: a component-specific identifier; an entity-specific identifier; and/or a reading-device-specific identifier.

The specific identifiers contain additional information which may be used upon the check of the proper performance of the action for comparison purposes.

Preferably, the one code is projected (directly) onto the location being associated with the associated action.

Thus, the projection indicates the location where the action is to be performed. In particular, this is advantageous in case of maintenances since the maintenance technician is guided by light to a component to be maintained, and may inspect the same. The projection assists the technician in navigating through the system and in identifying the component to be maintained. Finally, the code may be used for feedback to the control for verification purposes.

In particular, the projector is high resolution to project the one code from a distance of at least 3 m, 4 m, 5 m, or from a distance of more than 5 m onto the location.

Thus, the projector has a large coverage. This means that the (steerable) projector can illuminate many different locations without being moved. In a particularly advantageous configuration the projector is stationarily mounted, and therefore does not have to be configured movable, whereby costs can be reduced. Also, the control effort is reduced because the projector does not have to be moved. Nevertheless, the projector, due to its high resolution, is capable of displaying the location-specific code with sufficient resolution despite the large distance to the projection location. This particularly applies if the code has to be machine-readable, and has a high information density.

Preferably, the intralogistics system comprises a data structure defining one or more of the actions and including, for each of the defined actions, a single one of the location-specific codes describing uniquely a coordinate in the intralogistics system, onto which the one code is to be projected by the projector.

The data structure is the basis for data comparison, which may be performed in the context of the verification. The data structure allows simply comparing information that is expected to match.

In particular, the data structure includes further, for each of the actions, an order type, one of the entities, a system component, and/or a time specification.

Further, the codes may be machine-readable, preferably exclusively, by the reading device, and evaluated by the control.

Thus, the code may not be evaluated by the picking person itself, which reduces the risk of corruption.

Further, it is advantageous if the code is formed one-dimensionally or two-dimensionally for imaging the location coordinate uniquely in terms of a pattern.

The code may not be read by the technician, which reduces the possibility of tricking the system. But the code is machine-readable, and may have a high information density.

Further, it is desirable that the verification is performed, in case of the maintenance, by reading and transmitting, by the reading device, a system-component identifier, and checking it by the control; and/or by checking, by the control, whether the system component, which is also associated with the order, goes offline during a predetermined period of time after the code was read.

Preferably, in case of the material-flow control, the verification is performed by the reading device attached to the vehicle, which is the movable entity, reading the one code at a waypoint, which needs to be passed by the vehicle in accordance with a preplanned material-flow control and onto which (or within the immediate vicinity thereof) the code is projected, the confirmation signal further comprising a vehicle-specific identifier, and preferably a timestamp corresponding to the reading of the one code, and the control checking the pre-planned material-flow control by comparison against data resulting from an evaluation of the confirmation signal.

In particular, the verification by the control includes a check that the received code, which was read, matches with the code being assigned to the corresponding action; and that the control, when the codes match, outputs a further confirmation signal to the corresponding movable system entity and causes this system entity to continue its current action, or that the control, when the codes do not match, outputs a correction signal to the corresponding movable entity and causes this system entity to perform the predetermined action instead of its current action.

It is important for effective material-flow control that a pre-planned material flow is implemented in reality as good as possible because each error leads to delays. Therefore, a plurality of stationary scanners is employed, which read the material-flow items again and again for comparing (and equalizing) these real-time data to the planned data in order to take corrective actions, if necessary. Stationary scanners are expensive, require maintenance, and have to be put into operation. Therefore, it is desirable to create a system in which the number of scanners may be reduced, or the scanners may be eliminated completely.

BRIEF DESCRIPTION OF THE DRAWINGS

It is understood that the features mentioned above, and those to be explained below, can be used not only in the respectively given combination, but also in other combinations or on their own, without departing from the scope of the present disclosure. Embodiments of the disclosure are shown in the drawings and explained in more detail in the following description.

FIG. 4 shows a data structure, for example, in tabular form.

DETAILED DESCRIPTION

The present disclosure generally relates to the field of intralogistics, and in particular to an (automated) monitoring of maintenance operations, as well as to tracking of material flow performed, for example, by driverless transport vehicles (DTVs), in an intralogistics system (storage and/or picking system, for example, in production logistics or in goods-distribution logistics).

The term "intralogistics" encompasses the organization, control, performance, and optimization of an internal material flow, information streams, and the handling of goods in industry and retail. The term "material flow" refers to all processes and their interlinking in the manufacturing, processing and distribution of goods and objects within certain defined areas (e.g., goods receipt, warehouse, order picking, and/or goods issue). The material flow is controlled by a material-flow computer (MFC), which checks source-destination relationships and coordinates a sequence in which individual orders (transport orders) are processed.

Figure 1:
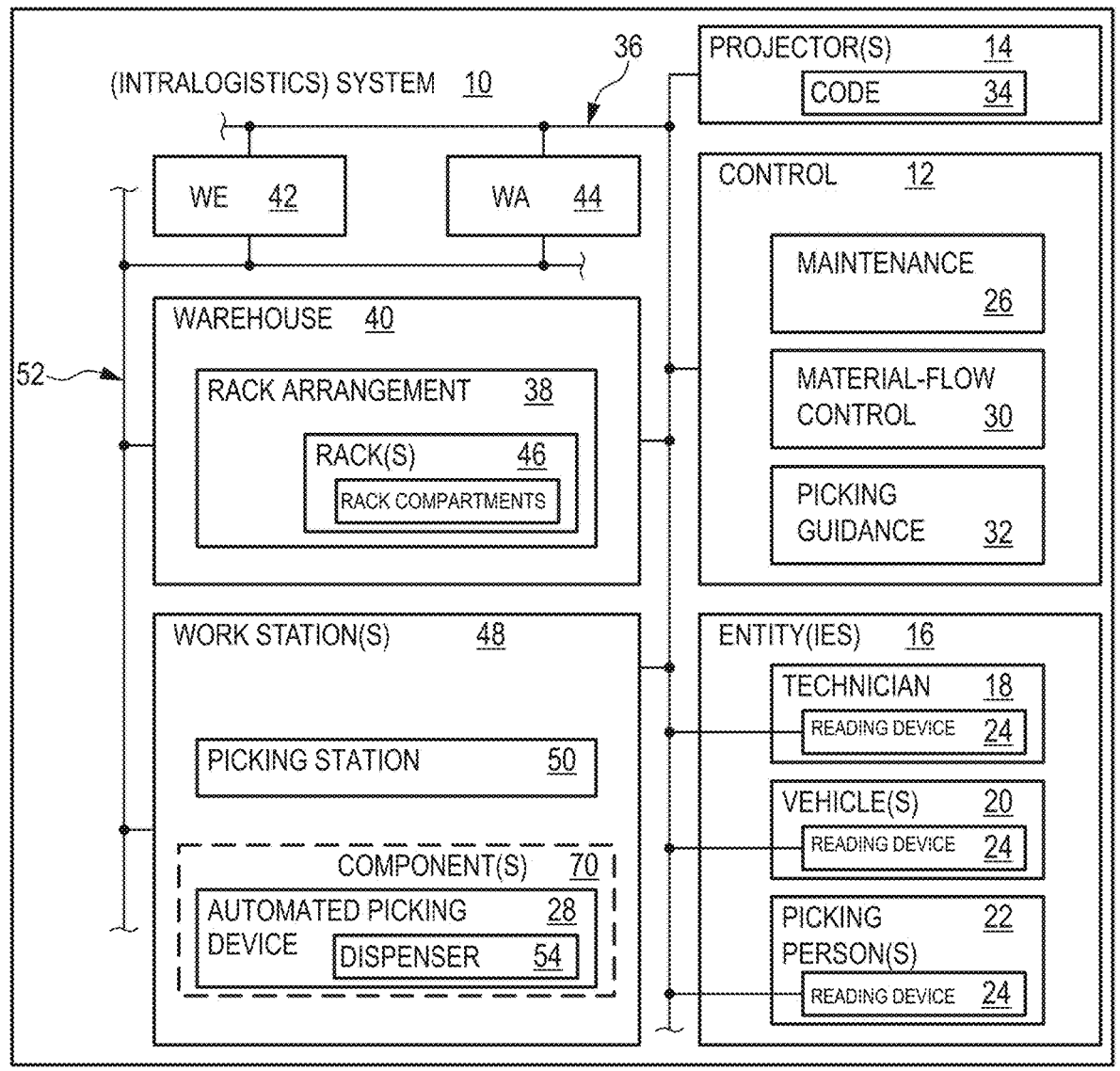
FIG. 1 shows a block diagram of an intralogistics system.

FIG. 1 shows a block diagram of an intralogistics system 10, which will be referred to in the following as system 10 and can be, for example, a storage and order-picking system. Typically, the system 10 is accommodated in a building (such as a hall).

The system 10 includes a (higher-level) control 12, at least one projector 14, and at least one movable (system) entity 16, such as a (maintenance) technician 18, a (driverless transport) vehicle 20 and/or a picking person 22, each entity 16 carrying along a reading device 24.

As the reading device 24, the technician 18 can carry along, for example, a smartphone.

Figure 5:
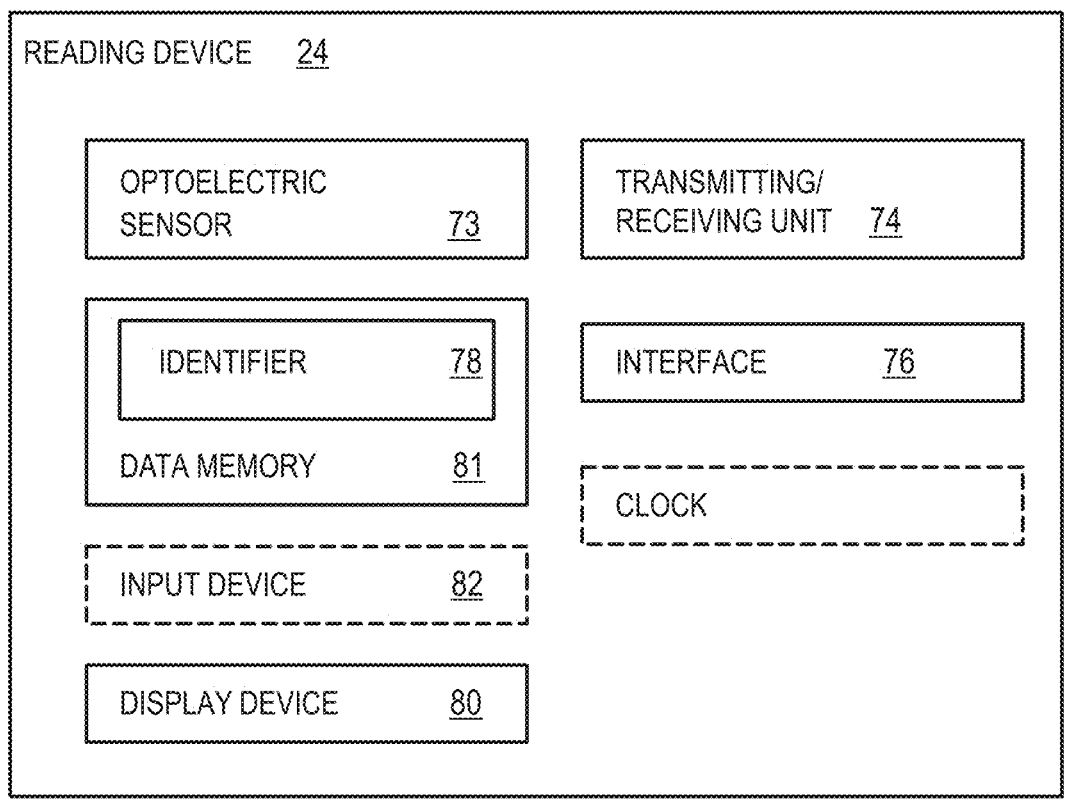
FIG. 5 shows a block diagram of a reading device.

The reading device 24 can be integrated into the vehicle 20, wherein the reading device 24 and the vehicle 20 can commonly share required functional units, such as a transmitting/receiving unit 74, and/or a data memory 81 (cf. FIG. 5).

The control 12 of FIG. 1 can be provided centrally, or in a decentrally distributed manner. The control 12 includes a data-processing system (not shown) including one or more processors (not shown) and one or more data memories (not shown), where one or more programs are stored, which are executed by the processors for implementing functions of the system 10.

Exemplary functions of the control 12 are: performing and monitoring a maintenance 26 of a system component 70 (e.g., an automated picking device 28, or one of the vehicles 20), tracking a material flow 30, and/or performing a picking guidance 32 (e.g., removal by means of Pick-by-Light (PbL), or delivery by means of Put-to-Light (PtL)). "Tracking" means tracking of movable objects (articles, load carriers, vehicles 20, etc.) in real time. Based on tracking data, it can be verified whether the preset material flow 30 is executed, or runs, in accordance with its planning.

Each of the projectors 14 is configured to project a location-specific code 34, for example, onto a floor, onto a wall, or onto one of the system components. Location-specific means that the code 34 includes a unique information on its respective projection location.

The projection is caused by the control 12, which transmits corresponding control signals (not shown) via a (wireless and/or wired) communication network 36 (e.g., a bus system, WiFi network, and/or 5G network) to the projector (s) 14. Each of the projectors 14 is configured to generate projections in terms of visible light at many different (projection) locations within the system 10, even during the day. The projections can be generated simultaneously, or sequentially one after the other, by each of the projectors 14.

Preferably, the projectors 14 are installed stationary (e.g. on the ceiling of a hall), but may also be formed movable (e.g. via a rail-carriage system) in order to cover large areas of the system 10, or the entire system 10, by some few or even only one single projector 14. The projectors 14 basically cover larger (functional) areas (e.g., a rack arrangement 38 in a warehouse 40) of the system 10 so that each of the projectors 14 can project, in particular at the same time, location-specific codes 34 onto many different locations 68 (cf. FIG. 4). For achieving a large coverage the distances between the projectors 14 and the (freely selectable) projection surfaces should be selected large, which requires sufficient high resolution from the projectors 14, in particular because the location-specific codes 34 need to be machine-readable.

Figure 2A:
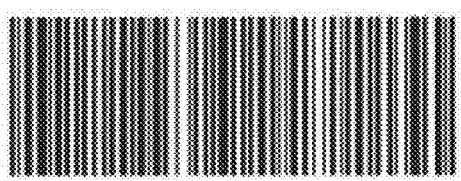
FIGS. 2A and 2B show an exemplary 1D code (FIG. 2A) and an exemplary 2D code (FIG. 2B).
Figure 2B:

Each of the codes 34 may be a one-dimensional code 34 (1D code, such as a barcode, cf. FIG. 2A) or a two-dimensional code 34 (2D code, such as a QR code, cf. FIG. 2B). The code 34 is machine-readable, preferably exclusively, by the reading device 24, and can be evaluated electronically by the control 12. The code 34 is location-specific, i.e. each of the codes 34 is uniquely assigned to one (single) location within the system 10. With other words, each location in the system 10 may be illuminated with a different code 34. The location information is included in the code 34.

Therefore, the projectors 14 can be equipped with a steering and autofocusing system (not shown) for projecting the codes 34 even from greater distances, e.g., from more than 3 m, 4 m, 5 m or more, in a machine-readable manner onto the desired location.

Figure 3:
FIG. 3 illustrates a DLP projector integrated into car headlights.

For example, projectors 14, which are suitable for the present applications, are "DLP" projectors from the company "Texas Instruments" offered, for example, under the product name "DLP5531". FIG. 3 illustrates an example where the DLP projector is integrated into a car headlight for projecting information, for a driver, in terms of text onto the road.

The 1D and 2D codes 34 of FIG. 2 are opto-electronically readable information consisting of lines and/or dots of varying widths and spaces in-between, with the greatest possible contrast. In the broadest sense, the term optoelectronics encompasses all products and methods allowing the conversion of electronically generated data and energy into light emission, and vice versa. In contrast to the 1D codes 34, the data in the 2D code 34 is not coded in one direction only, but in the form of a surface over two dimensions. The 2D advantage is a higher density of usable information. In the present disclosure the term "code" is not a type of encryption, but refers to presentations of data in terms of symbols. The data in the code 34 is machine-read by the reading devices 24, such as camera scanners.

The system 10 may further comprise (optionally): a goods receipt (WE) 42; a goods issue (WA) 44; the warehouse 40 including the rack arrangement 38 consisting of one or more racks 46; one or more work stations 48, such as a picking station 50, a packing station, etc.; and/or a conveyor system 52. These are functional areas and functional components of the system 10.

The conveyor system 52 generally refers to technical systems for implementing the material flow 30, i.e. conveying device(s), which substantially cause internal location changes, i.e. transport, of (conveying) items. The conveying devices include two groups (not shown): continuous conveyors and discontinuous conveyors. Continuous conveyors (e.g., roller conveyors, belt conveyors, chain conveyors, overhead conveyors, etc.) operate continuously and are usually installed stationary. Discontinuous conveyors, such as the vehicles 20 (driving robots, flying drones, etc.), convey and transport the conveying items either free, i.e. autonomously or independently, or track-guided or force-guided, along conveying lines (route between source and destination). The conveying devices connect the WE 42, the WA 44, the warehouse 40, and/or the work stations 48 to each other in terms of material flow. The material-flow control takes care that the items are transported along the conveyor system 52 in accordance with transport orders, which can be caused by picking orders.

Hereinafter, the term navigation is understood to mean, in accordance with DIN 13312:2005-02, wayfinding (routing) through a travelling course and position determination within the travelling course. A path, or route, from an arbitrary starting point to an arbitrary destination point in the travelling course is preset by the control 12 as part of the material flow 30. A check, whether the planned route is actually taken, occurs as part of the tracking using the location-specific codes 34, as will be explained in more detail below.

The location-specific code 34 is also used for maintenance purposes, in particular for ensuring that the technician 18 actually walks to a system component 70 and maintains the same. Each component 70 of the system 10 requires maintenance over (operation) time. Exemplary system components 70 are the vehicles 20, or the automated picking devices 28. During the maintenance the system component may be, for example, checked, lubricated, re-adjusted, or the like. The maintenance may include a repair, a component exchange, a conversion, putting into operation, a re-installation (e.g. correct installation and positioning), and the like.

Figure 6:
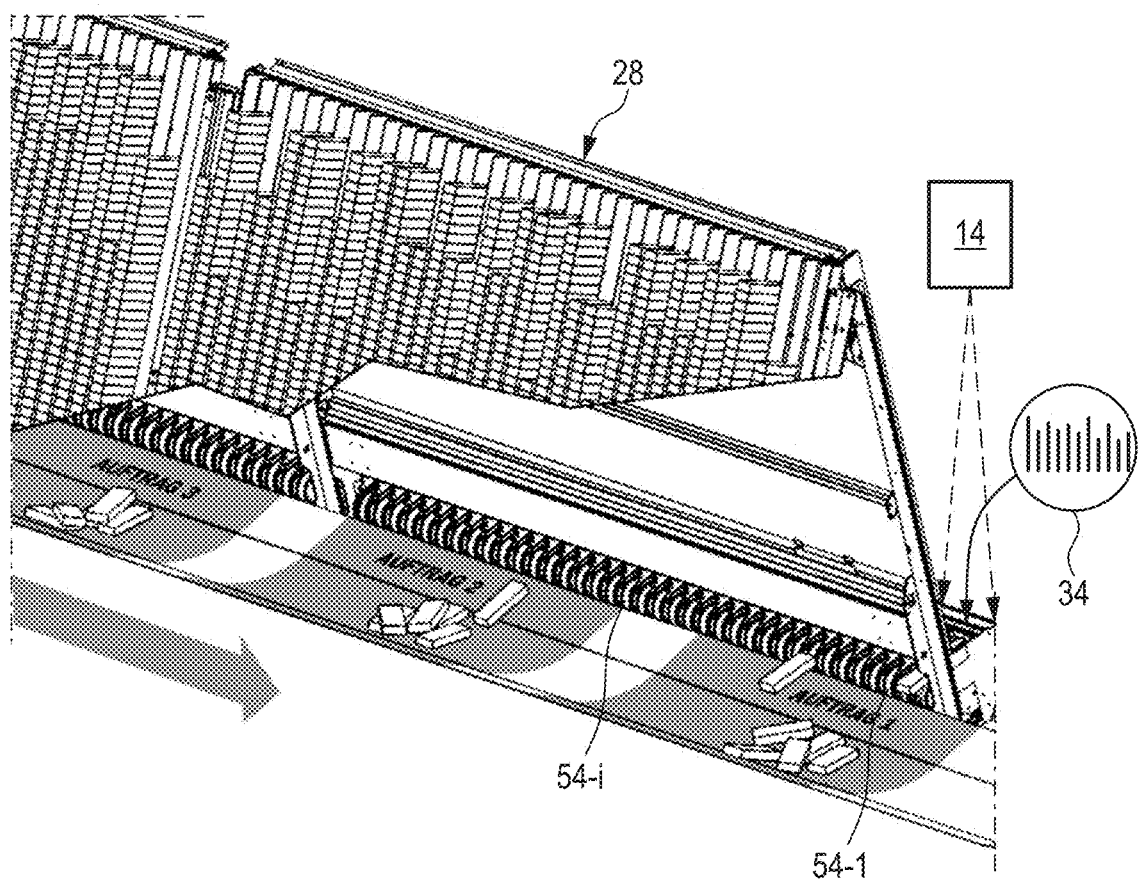
FIG. 6 illustrates a maintenance situation.

Hereinafter, an automated picking device 28 is exemplarily considered, which comprises a plurality of (product) dispensers 54, which in turn represent components 70, in order to separate individually products, which are stored within the automaton 28, according to a picking order, cf. also FIG. 6. One or all of the dispensers 54 are to be maintained. In this case, these dispensers 54 exemplarily are the system components 70, which are to be maintained. It is understood that the automaton 28 itself may also be the component 70 to be maintained. Further, it is understood that the to-be-maintained component may be each object within the system 10, even software being installed in a device of the system 10.

The control 12 further includes a data structure 55 which is schematically shown in the block diagram of FIG. 4. FIG. 4 exemplarily shows a tabular representation of the data structure 55 consisting of lines 56 (56-1, 56-2, . . . , 56-$i$) and columns 58 (58-1, 58-2, . . . , 58-$j$), each of data fields 60. One line 56 of the data structure 55 may consist of one or more data fields 60 of different types of data field 62. Each of the lines 56 represents an action to be performed within the system 10, such as the component-specific maintenance 26, the tracking of the material-flow control 30, or even the picking guidance 32, if necessary. Each of the lines 56 further represents an order, into which the action is converted by the control 12. The data structure 55 of FIG. 4 also represents several actions, or orders.

The orders can be processed subsequently or simultaneously. The location-specific codes 34 are correspondingly projected subsequently or simultaneously onto corresponding locations 68.

Possible types of data-field 62 of the data structure 55 are: an order number 64, a code number, or the code 34, an order type 66, the system entity 16, a location (i.e. a coordinate) 68 within the system 10, a system component 70, and/or a time specification 72. The time specification 72 may include information on when the associated code 34, and/or how long the associated code 34, is to be projected. The entity-data field may include information on the associated entity 16, such as an individual entity identifier 78, a reading device 24 belonging to the entity 16, or the reading-device identifier 78 thereof, and the like, as will be explained in more detail below.

Hereinafter, the first line 56-1 is examined in more detail, which exemplarily concerns a (control-initiated) maintenance action. The control 12 generates the corresponding maintenance order ("order #1"). The generation may be alternatively caused (manually) by an operator of the system 10. Upon the automatic generation the control 12, for example, may access a database (not shown) where an actual service life, inspection intervals, an average lifespan, etc. of a component 70 are stored. If the actual service life approaches the average lifespan the control 12 recognizes this and automatically generates the corresponding maintenance order.

The first line 56-1 represents this first order #1, proper performance of which is to be ensured by the control 12. The (maintenance) order #1 defines that, for example, the fourth dispenser 54 of the fourth automated picking device 28 is to be maintained (e.g., inspected including component exchange, if necessary), which is to be executed by a first technician 18 ("technician #1"). Experience has shown that an (arbitrary) technician 18 requires 10 min in average for this maintenance, cf. the associated time specification ("10 min"). The (location) coordinates of the fourth automated picking device 28 (in relation to the system 10) are stored in the data of the location 68. Also, (location) coordinates (e.g., in relation to the fourth automated picking device 28) may be stored in the data of the component 70. The control 12 can use these coordinates for selecting, at first, a suitable projector 14 having a field of view in which the to-be-maintained component 70 is arranged. At second, the control 12 can use these coordinates for causing the corresponding projector 14 to project the associated location-specific code 34 in an (immediate) vicinity relative to the to-be-maintained component 70. From the location of the projection it must be unambiguously clear which of the components 70 is to be maintained, since the code 34 itself is not readable by the technician 18.

Thus, by means of the projection, the location 68 of the component 70, as well as the to-be-maintained component 70 itself, is visualized to the technician 18. This facilitates navigating the technician 18 through the system 10, and finding and identifying of the to-be-maintained component 70. This situation is illustrated in FIG. 6, where code 34 is projected, for a first dispenser 54-1, immediately in front of the first dispenser 54-1 of an automated picking device 28 (here: an A frame) in a uniquely assignable way.

As soon as the technician 18 has arrived at the location 68 of the to-be-maintained component 70, the projected code 34 is read by the optoelectric sensor 73 of the reading device 24, which is carried along by the technician 18. The reading device 24, cf. FIG. 5, generates a signal corresponding to the code 34 read, and transmits this signal by means of a transmitting and receiving unit 74 via a (data) interface 76 as confirmation (confirmation signal) to the control 12. This signal may include an individual reading-device identifier 78 and/or an individual technician identifier 78, which is stored in the reading device 24 within a data memory 81 and which may be stored (even) in the data field 60 of the entity 16 for comparison purposes. This signal may also include a timestamp (not shown) indicating when the corresponding code 34 was read.

The control 12 receives the signal from the reading device 24. The receipt of the signal confirms to the control 12 that the technician 18 has arrived at the to-be-maintained component 70. The signal is electronically evaluated by the control 12 for verifying the (proper) performance of the control-initiated action (here: maintenance order) based on the data of order #1 and the data from the confirmation signal received. Based on this information, the control 12 may ensure, by means of a comparison, that the right technician 18 is at the right component 70, which is to be maintained.

In case of maintenance, the verification is exemplarily performed by: the reading device 24 reading a (component-specific) system-component identifier, which is attached to the component 70 in terms of an additional code, by means of the reading device 24, and transmitting it to the control 12, and checking this read identifier 78 of the control 12 against the component-identifier 78, which is stored in the order #1 in the data field 60 of the component 70, for consistency; and/or by the control 12 checking whether the system component 70, which is associated with the order #1, goes offline during a predetermined period of time after the associated code 34 was read. Usually, the technician 18 removes the component 70, i.e. must separate the component from a supply of energy, so that the component goes offline. This separation may be monitored by the control 12 for verification purposes.

In case of discrepancies, the control 12 may contact the corresponding entity 16, in this case the technician #1, and transmit corrective advice being communicated, for example, visually (display device 80 in FIG. 5) or audible (spoken text) to the technician #1. For example, the control 12 may cause that a corrective information is indicated to the technician 18, for example, in case that the technician 18 is at the wrong location 68 and therefore has read the wrong code 34 not being assigned to this technician #1 but, for example, to a different maintenance technician 18 or to one of the vehicles 20 (e.g., the one of the line 56-2), which information tells the technician #1 the proper location 68.

After the maintenance 26 of the to-be-maintained component 70 is completed, the technician #1 may read, through the reading device 24, the code 34 again which is (optionally) still projected onto the location 68, in order to communicate to the control 12 the end of the maintenance 26. Alternatively, the technician 18 may use an (optional) input device 82 (cf. FIG. 5) of the reading device 24. The control 12 may verify, based on the associated time specification 72 (in FIG. 4: 10 min) and an actual time passed between the two readings being tracked, whether the technician #1 has actually performed the maintenance. In this way it may be prevented, for example, that the technician #1 reads the code 34 simply twice in quick succession in order to merely pretend that the maintenance 26 has been performed although the maintenance 26 actually has not taken place. Thus, the control 12 may verify by means of feedback that the maintenance 26 has actually taken place. The technician #1 cannot predict how the specific code 34, which is individual for this maintenance 26, looks like so that the corresponding process is fraud-proof.

The projection of the location-specific code 34, which belongs to one of the orders 64, may also occur by coincidence. This means that the associated code 34 is not displayed to the technician 18 at each of the to-be-maintained components 70. In this case the corresponding maintenance order is (also) communicated to the technician 18 via a different medium, such as via a visual display (coordinate, component type, etc.) on the display device 80 of the reading device. Thus, in this case, the technician 18 can never be sure when and where an (automatic) confirmation of the proper performance of the maintenance 26 is requested by the control 12. However, system operator can be sure that the maintenance 26 was performed properly, since the technician 18 cannot outwit the control 12 since, for example, the technician 18 reads component-identifiers 78 printed in advance without having actually inspected the corresponding component 70.

The procedure described above in connection with the maintenance 26 may also be applied analogously to check of the material-flow control 30.

The case of checking the material-flow control 30 will be described exemplarily based on the second line 56-2 of the data structure 55 of FIG. 4. The second line 56-2 describes the order #2, which defines material-flow tracking in the second column 58-2 as an action to be performed. The order #2 is associated with one vehicle 20 being designated as AGV ("autonomous guided vehicle") #3. The AGV #3 is supposed, according to the planned material flow, to be at a crossing #2 of the conveyor system 52 at 14:35. The control generates a corresponding code #2, which is projected onto the floor for a certain period of time at the coordinate, or at the location 68, corresponding to the crossing #2. If the AGV #3 passes at 14:35, as planned, the crossing #2, the vehicle-integrated reading device 24 can read the code #2, which is projected onto the crossing #2, together with the identifier 78 of the AGV #3, and transmit a corresponding timestamp to the control 12 for further evaluation, i.e. check. The control 12 may check, based on the transmitted signal, whether the AGV #3 has actually passed the crossing at 14:35, and may intervene, if necessary. A possible correction is that the planned material flow is adjusted in a timely manner to the actual conditions (AGV #3 has passed the crossing #2, for example, earlier or later). Another possible correction is that the AGV #3 is decelerated or accelerated for reaching the next waypoint of its route in time, i.e. at the planned time.

The above-described procedure may also be applied analogously to the picking guidance 32, which will be described below using the third line 56-3 of the data structure 55 of FIG. 4 as an example.

According to the order #3, the picking person #2 processing a picking order #8 is supposed to remove articles from a rack compartment #5. A corresponding location-specific code #3 is projected onto the corresponding coordinate, or onto the location 68, of the rack compartment #5. In this case there is no time specification 72 because it is not clear in advance when the picking person #2 will perform the removal at the rack compartment #5. As soon as the picking person #2 has reached the rack compartment #5, due to optical guidance by means of the code #3 being projected there, it scans the code #3. The corresponding signal is transmitted together with the corresponding reading-device identifier 78 and/or the corresponding picking-person identifier to the control 12. The control 12 evaluates this signal and checks, based on the data resulting from the evaluation, whether the picking order #8 was processed properly. If the picking person #2 has scanned the wrong code 34 belonging to a different compartment, or to another picking order, the control 12 may correctively intervene in the above-described way.

Thus, different applications have been described that are based on the data structure 55, which is exemplarily described in FIG. 5. It is understood that the data structure 55 does not necessarily have to be in tabular form. The data structure 56 can also be stored in a relational database.

However, the data structure 55 allows the control 12 to verify different actions, which are to be performed in the system 10 by humans or machines, in order to avoid errors and to ensure proper performance of a planned action.

LIST OF REFERENCE SIGNS 10 (intralogistics) system
12 control
14 projector
16 (system) entity, movable
18 (maintenance) technician
20 (transport) vehicle
22 picking person
24 reading device
26 maintenance
28 automated picking device
30 material flow/material-flow control
32 picking guidance
34 code
36 communication network
38 rack arrangement
40 warehouse
42 goods receipt (WE)
44 goods issue (WA)
46 rack
48 work station
50 picking station
52 conveyor system
54 dispenser
55 data structure
56 line
58 column
60 data field
62 type of data field
64 order number
66 order type
68 location
70 (system) component
72 time (specification)
73 optoelectric sensor
74 transmitting/receiving unit
76 (data) interface
78 identifier
80 display unit
81 data memory
82 input device

The invention claimed is:

1. An intralogistics system for monitoring a predetermined location-specific action being uniquely associated with a location of a plurality of different locations in the intralogistics system and being uniquely associated with a movable system entity, which is to perform the action, wherein the intralogistics system comprises:
   a control communicating an order, which is uniquely associated with the action, to the movable system entity and being configured for at least one of:
      maintenance of one system component of a plurality of system components; and/or
      tracking of material-flow control;
   a reading device, which the movable system entity carries along and is connected to the control for data exchange; and
   a projector configured to project location-specific codes, on command from the control, onto several ones of the locations within the intralogistics system;
   wherein the control is configured further to verify performance of the action based on the order and received confirmation signal, which is generated by the reading device and transmitted to the control as soon as the reading device has read one of the location-specifically projected codes.

2. The intralogistics system of claim 1, wherein the control is configured to project one of the codes at a time only.

3. The intralogistics system of claim 1, wherein the control is configured to project several ones of the codes at the same time onto the corresponding locations.

4. The intralogistics system of claim 1, wherein the confirmation signal further comprises at least one of:
   a component-specific identifier;
   an entity-specific identifier; and
   a reading-device-specific identifier.

5. The intralogistics system of claim 1, wherein the one code is projected onto the location being associated with the associated action.

6. The intralogistics system of claim 5, wherein the projector is high resolution to project the one code from a distance of at least 3 m, 4 m or 5 m, or from a distance of more than 5 m, onto the location.

7. The intralogistics system of claim 1, comprising a data structure defining one or more of the actions and including, for each of the defined actions, a single one of the location-specific codes describing uniquely a coordinate in the intralogistics system, onto which the one code is to be projected by the projector.

8. The intralogistics system of claim 7, wherein the data structure includes further, for each of the actions, at least one of: an order type, one of the entities, a system component, and a time specification.

9. The intralogistics system of claim 1, wherein the codes are machine-readable by the reading device and are evaluated by the control.

10. The intralogistics system of claim 9, wherein the codes are one-dimensional or two-dimensional in order to uniquely represent a location coordinate in terms of a pattern.

11. The intralogistics system of claim 9, wherein the codes are exclusively machine-readable by the reading device.

12. The intralogistics system of claim 1, wherein the verification in case of the maintenance is performed by at least one of:

reading further and transmitting, by the reading device, and checking, by the control, a system-component identifier; and checking by the control whether the system component, which is also associated with the order, goes offline during a predetermined period of time after the one code was read.

13. The intralogistics system of claim 12, wherein the confirmation signal further comprises a timestamp corresponding to the reading of the one code.

14. The intralogistics system of claim 1, wherein the verification in case of the material-flow control is performed by the reading device attached to a vehicle, which is the movable entity, reading the one code at a waypoint, which has to be passed by the vehicle in accordance with a pre-planned material-flow control and onto which the one code is projected, the confirmation signal further comprising a vehicle-specific identifier, and the control checking the pre-planned material-flow control by comparison against data resulting from an evaluation of the confirmation signal.

15. The intralogistics system of claim 1, wherein the verification by the control includes a check that the received code read matches with the code being associated with the corresponding action; and the control, when the codes match, outputs a further confirmation signal to the corresponding movable system entity and causes this system entity to continue its current action, or the control, when the codes do not match, outputs a correction signal to the corresponding movable system entity and causes this system entity to perform the predetermined action instead of its current action.

16. The intralogistics system of claim 1, wherein the control is configured for at least one of:

the maintenance of the system component of the plurality of system components;

the tracking of the material-flow control; and performance of a picking guidance.

\* \* \* \* \*